July 9, 1935.  J. VOSS  2,007,488

BEER APPARATUS

Filed Feb. 12, 1934  3 Sheets-Sheet 2

John Voss
Inventor

Threedy and Cannon
His Attorneys

July 9, 1935.  J. VOSS  2,007,488
BEER APPARATUS
Filed Feb. 12, 1934   3 Sheets-Sheet 3

John Voss
Inventor

His Attorneys

Patented July 9, 1935

2,007,488

UNITED STATES PATENT OFFICE 2,007,488

BEER APPARATUS

John Voss, Chicago, Ill., assignor of one-third to Arthur I. Epton and one-third to Harry A. Steinmeyer, both of Chicago, Ill.

Application February 12, 1934, Serial No. 710,834

4 Claims. (Cl. 225—15)

This invention relates to beer apparatus.

It is an object of this invention to provide an improved beer apparatus which is relatively simple and inexpensive in construction and efficient in use.

Another object of this invention is: to provide a new and improved apparatus for utilizing compressed air to force draft beer from a beer barrel through the cooling coils to the taps, and for utilizing the pressure of the municipal or like water supply line for compressing the air necessary to force the beer from the beer barrel through the cooling coils to the taps.

A further object of the invention is to construct the new apparatus so that the compressed air is cooled, washed, and cleaned before it enters the compressed air storage tank and beer barrel so that the compressed air enters into the beer barrel in a cool, sanitary condition, thereby preventing the beer from contamination and exerting a cooling effect upon the same.

An additional object of the invention is to provide a new and improved draft beer apparatus which is so constructed that by means thereof the beer line or tap line between the beer barrel and the taps, including the cooling coil, may be readily drained when not in use so as to prevent souring and spoiling of the beer in the dispensing line between the barrel and the taps, which happens when the beer is allowed to stand unused in the dispensing or tap line and cooling coils overnight or for other like periods of time.

Still another object of the invention is to construct the new apparatus so that the beer is prevented from backflowing from the beer barrel into the air pressure storage tank.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 6 is an end elevational view of a self-closing rubber air valve embodied in the invention;

Fig. 7 is a side elevational view of the air valve shown in Fig. 6;

Fig. 8 is a vertical sectional view on line 8—8 in Fig. 7;

Figure 1:
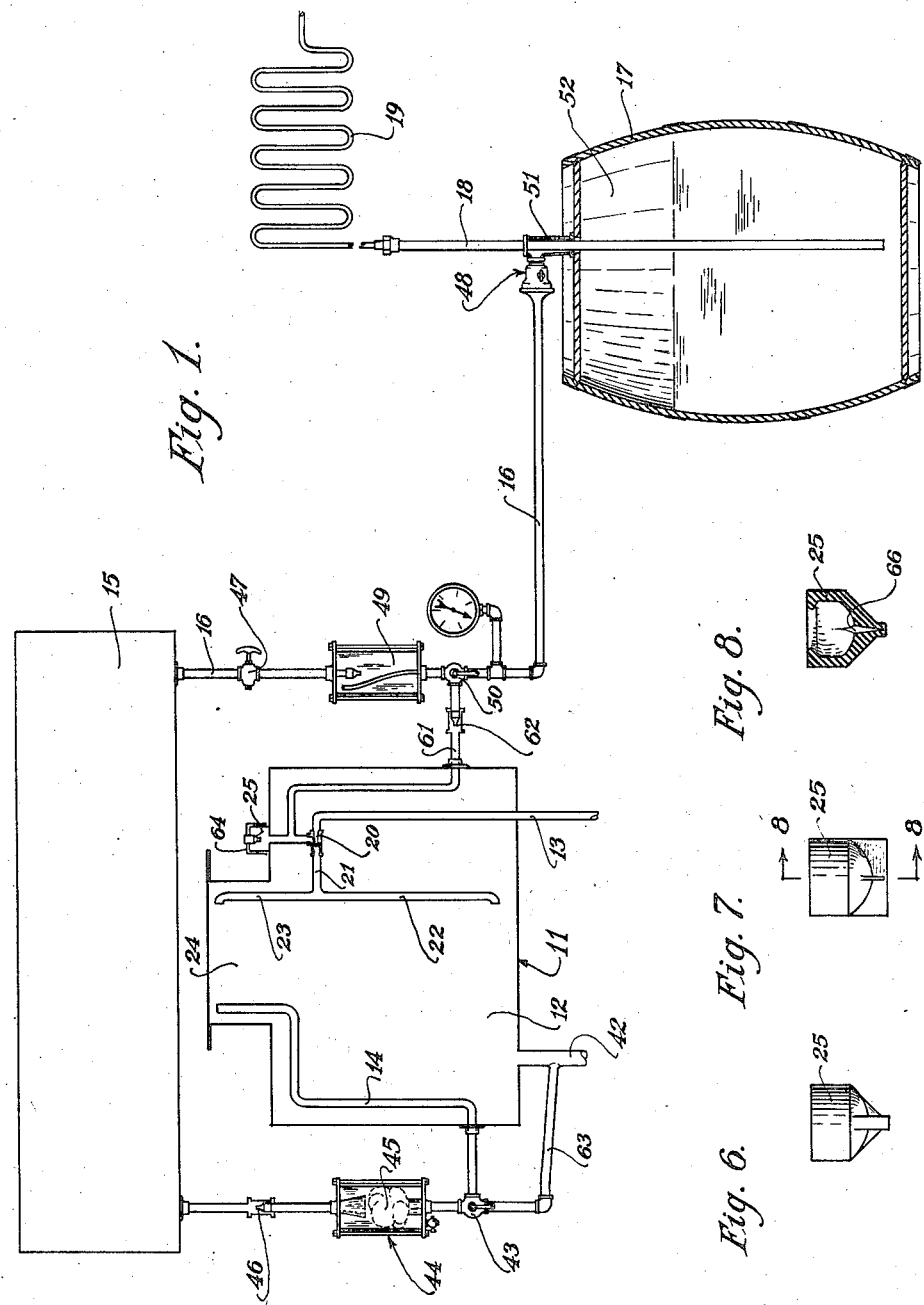
Fig. 1 is a diagrammatic view, partly in section, illustrating a preferred embodiment of the invention.
Figure 2:
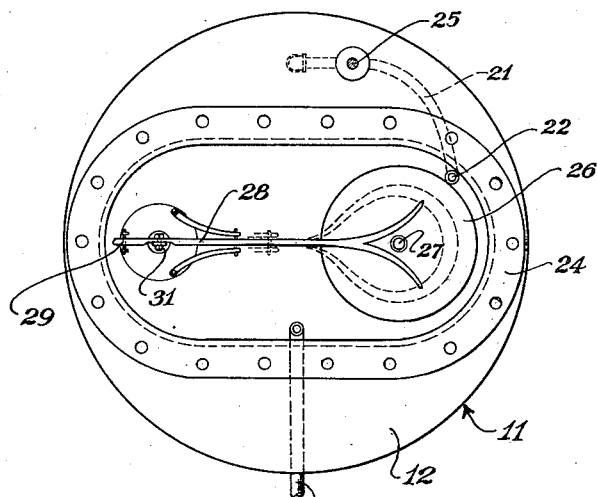
Fig. 2 is a top plan view of the new compression chamber and air-compressing unit therein and embodied in the new apparatus.

A preferred embodiment of the invention is illustrated in the drawings and is shown diagrammatically in Fig. 1, to which reference is now made for an understanding of the general operation of the new apparatus before proceeding with a detailed description of the same.

In the drawings 11 generally indicates the new air-compressing unit which embodies an air compression chamber or tank 12 having a water inlet line 13 which is adapted for connection to a municipal or other source of water under pressure so as to admit water into the air compression chamber or tank 12 wherein air is compressed as the water level rises. From the tank 12 the air passes by way of a conduit 14 to a compressed air storage tank 15. From the storage tank 15 the compressed air, or air under pressure, passes by way of a conduit 16 to the beer barrel 17, forcing the draft beer up out of the barrel 17 through the tap or dispensing line or tube 18 and cooling coils 19 to the dispensing valves or taps (not shown).

The inflowing water, under pressure, passes from the intake line 13 through an ejector nozzle 20 (Fig. 3) into an ejector pipe or tube 21 from which it passes by way of a branch pipe 22, that is connected to the ejector tube 21, into the bottom portion of the air compression chamber 12. As the inflowing water passes under pressure from the ejector nozzle 20 into the ejector pipe 21, it forces the air out of the ejector pipe 21, from which the air passes, by way of a branch pipe 23, into the upper portion 24 of the chamber 12; this portion 24 of the chamber 12 being considerably reduced in size and diameter, relative to the body of the air compression chamber 12, so that the air confined therein will be compressed by the inflowing water to a greater degree of pressure than would be the case if the upper area 24 of the air compression chamber were of the same diameter as the body of the tank 12.

The movement of the air through the ejector tube 21 causes the air pressure on the inner side of a conventional elastic or rubber air valve 25 of the self-closing type (see Figs. 3, 6, 7, and 8) to be reduced below atmospheric air pressure whereupon air under atmospheric pressure enters the ejector tube 21 from the atmosphere through the rubber valve 25, distending the opening 66 therein. From the ejector tube 21 the air passes through the branch pipe 23 into the reduced area 24 of the air-compression chamber 12. At the same time the inflowing water passes through the branch pipe 22 into the air-compression chamber 12 and causes the float 26 therein to rise upon its vertical guide rod 27. In this manner the incoming air is washed and cooled as it mixes in the ejector tube 21 with water emerging from the ejector nozzle 20 so that it passes into the beer barrel 17, in a manner presently to be described, in a cool, sanitary condition.

Figure 10:
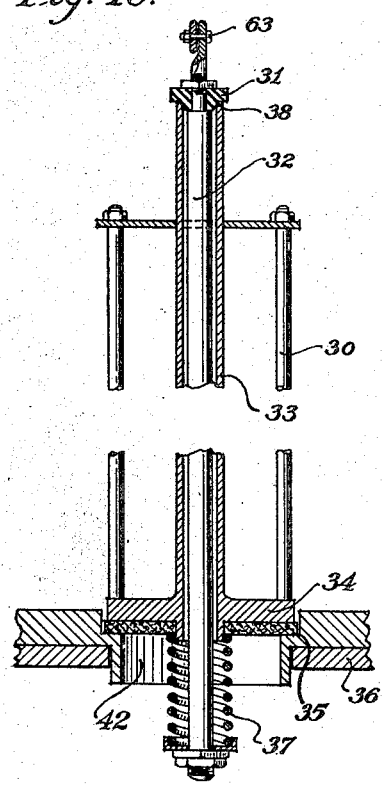
Fig. 10 is a vertical sectional view illustrating a new combination air and water valve embodied in the air-compressing unit.

As the water level in the air compression chamber rises, and the float 26 rises therewith, the washed and cooled air from the branch pipe 23 is confined and compressed in the reduced area 24 of the air compression chamber 12, and as the float 26 rises it eventually engages a valve-lifting lever or arm 28 which is pivotally mounted, as at 29, upon a bracket 30 that is arranged in the air compression chamber 12. Pivotally attached, as at 63, (Fig. 10), to the pivotal valve-lifting arm or lever 28 is a valve rod 32 which carries at its upper end a rubber valve head 31. This valve rod 32 is slidably mounted in a tubular valve sleeve 33 that is concentric therewith. The valve sleeve 33 carried at its lower end a valve head 34 adapted to engage a valve seat 35 formed in the bottom wall of the casing 36 which provides the air compression chamber 12.

Arranged upon the lower end portion of the valve rod 32 (Figs. 9 and 10), below the valve head 34, is a coil spring 37. When the float 26 engages the valve-lifting lever or arm 28 it raises the latter, pivoting the same at 29 (counter-clockwise, Figs. 3 and 9). During the first part of this movement of the lever 28 the latter raises the valve head 31 off its seat 38, which is formed in the upper end of the valve sleeve 33, thereby allowing air to escape from the reduced air compression area 24 of the compression chamber 12 down through the tubular valve sleeve 33, which opens at its lower end into a drain outlet 42 that leads out of the air compression chamber 12. This escape of air from the reduced air compression area 24 of the compression chamber 12 occurs at the end of each air-compressing cycle and reduces the air pressure upon the float 26 sufficiently to increase considerably the buoyancy of the float 26, thereby causing the latter to rise rather abruptly or suddenly. This abrupt or sudden rise of the float 26 causes the float 26 to effect a further upward movement (counter-clockwise, Figs. 3 and 9) of the valve-lifting lever 28 and also a further upward movement of the valve rod 32. This further upward movement of the valve rod 32 compresses the spring 37 and eventually lifts the valve head 34 off its seat 35, thereby allowing the water in the compression chamber 12 to flow out through the drain or outlet 42 to the sewer. The valve 34—35 is held open, by mechanism presently to be described, until the water has practically all run out of the compression chamber 12 and the cycle of operations commences over again with the inflow of water and consequent air compression. This prevents the system from reaching a point of equilibrium between the rates of inflow and outflow of water into and out of the chamber 12, and consequent inoperativeness, that would otherwise occur; it being understood that the intake through line 13 is always less than the outflow through 42. This point of equilibrium is never reached in the present apparatus, however, because the intake line 13, when once opened, (by a suitable valve not shown) remains open as long as the apparatus is in operation, that is, until the air pressure in the storage tank 15 equals the pressure of the water in the intake line 13.

Figure 3:
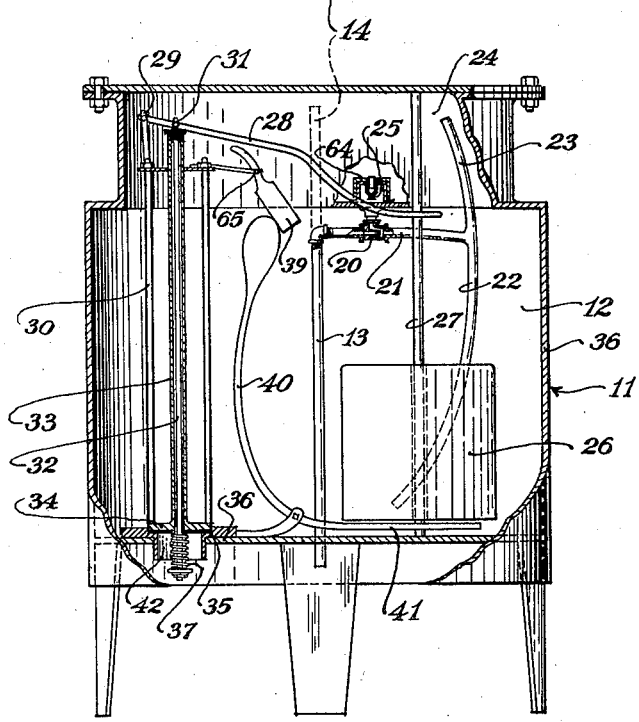
Fig. 3 is a vertical sectional view of the air compression chamber and air-compressing unit therein.
Figure 4:
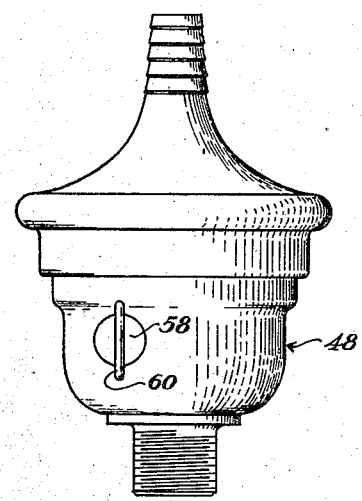
Fig. 4 is an elevational view of a valve embodied in the invention.
Figure 9:
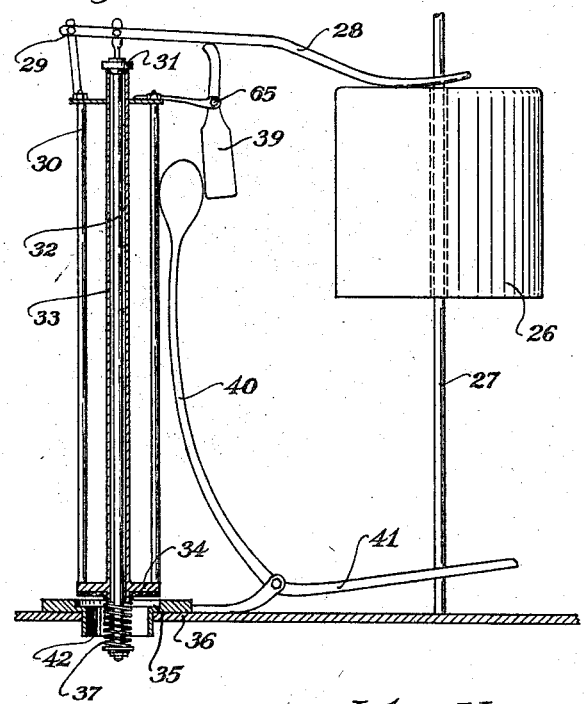
Fig. 9 is a vertical sectional view illustrating a part of the new air-compressing unit.

To drain the air-compression chamber 12 at the end of each air-compressing cycle, the discharge valve 34—35 is held open by the valve-lifting lever 28, in the following manner:

To this end there is pivotally mounted in the air-compression chamber 12, upon the supporting bracket 30, as at 65, a counterweighted keeper or latch arm 39 which tends to gravitate (clockwise, Figs. 3 and 9). Normally the keeper or latch 39 is prevented from so gravitating and is held in the position of Fig. 3 by engagement of its lower counterweighted portion with a counterweighted trip 40 which tends to gravitate (counterclockwise, Fig. 3).

When the air-compression and water chamber 12 is empty, the float 26 is disposed in its lowered position and rests upon an arm 41 of the trip lever 40, as in Fig. 3. However, as the float 26 rises with the water level in the chamber 12 it releases the arm 41 of the trip 40 and the latter gravitates (counterclockwise, Figs. 3 and 9) into the position of Fig. 9, thereby releasing the latch or keeper 39, which thereupon tends to gravitate (clockwise, Figs. 3 and 9) into vertical position, as in Fig. 9. The keeper 39 is, of itself, unable to raise the valve-lifting lever 28 with which it engages as soon as the float 26 rises and the trip 40 gravitates into the position of Fig. 9. However, when the float 26 rises into engagement with the valve-lifting lever 28 and opens the air valve 31—38 to reduce the air pressure on the float 26 and consequently increase the buoyancy of the float, the latter rises abruptly for a short distance, as stated, and in so doing, raises the valve-lifting lever 28 sufficiently to enable the keeper 39 to gravitate into vertical position (Fig. 9) wherein it engages under the valve-lifting lever 28 and holds the latter in raised position and the water discharge valve 34—35 open until the water is practically discharged from the water chamber 12. At this time the float again seats upon the arm 41 of the trip 40 and pivots the latter (clockwise, Figs. 3 and 9) into the position of Fig. 3 so that the trip 40 engages the latch or keeper 39 and pivots the latter (counterclockwise, Fig. 3) into the position of Figure 3, thereby allowing the valve-lifting lever 28 to drop, whereupon the spring 37 pulls the valve rod 32 downwardly and closes the water discharge valve 34—35 and the air valve 31—38. The air-compressing cycle then starts over again. This cycle of operations continues until the air pressure in the storage tank 15 equals the pressure of the municipal or other water supply entering the chamber 12 by way of the intake 13.

The foregoing is an important feature of the present invention, and it will be noted therefrom that the several aforementioned movements taking place during the air-compressing cycle are automatic in operation.

As the air thus washed and cooled in the air compression and water chamber 12 passes by way of the conduit 14 to the air storage tank 15, it passes through a conventional three way valve 43 arranged in the conduit 14, for a purpose to be explained hereinafter, and through a combination trap, or back pressure valve, and air filter generally indicated at 44 and also arranged in the conduit 14. This device 44 comprises a transparent casing having a filter 45 of cotton or the like arranged therein to filter out any solid matter from the compressed air before it enters the air storage tank 15 so as further to assure that the air entering the storage tank 15 and the beer barrel 17 will be in a sanitary condition and free from contaminating solid impurities. This device 44 also functions to prevent any possible and accidental overflow of water from the chamber 12 into the conduit 14 from entering the air pressure reservoir or tank 15 and beer barrel 17. After leaving the combination filter and trap 44 the air passes through an air check valve 48 (such as the valve 24—25 shown in Figs. 6, 7, and 8) into the air storage tank 15.

The particular or specific construction of the combination air filter and trap 44 may be varied from that shown but the arrangement, position, and functions of the several elements of this device are of importance in the operation of the present apparatus.

Upon leaving the air storage tank 15 the compressed air flows into the conduit 16 (Fig. 1), thence through a conventional reducing valve 47 arranged in the conduit 16 by means of which the pressure of the air leaving the storage tank may be reduced to whatever pressure it is desired to have in the beer barrel 17. From the valve 47 the air passes through a trap 49 which is arranged in the conduit 16, and in addition to acting as a filter also acts to prevent any possible overflow from the beer barrel 17 entering into the air storage tank 15. After leaving the combination trap and filter 49 the air passes through a conventional three way valve 50, then through a valve 48, generally indicated at 48 and shown in detail in Figs. 9 and 10, into the upper area or air space 52 of the beer barrel 17, into which the air enters by way of an air inlet or bung 51 which is concentric with and encircles the dispensing pipe or tap line 18 at the top of the beer barrel 17 from which beer is thus forced through the tap line or pipe 18 and cooling coils 19 to the dispensing valves or taps (not shown).

Figure 5:
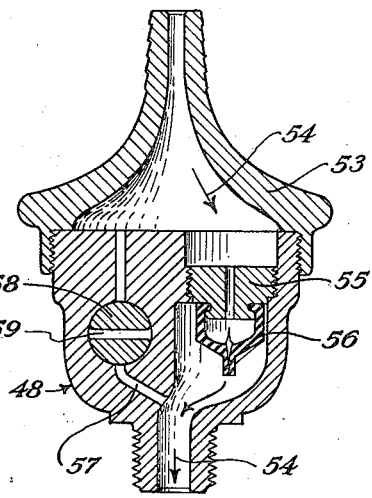
Fig. 5 is a longitudinal sectional view of the valve shown in Fig. 4.

The valve 48 comprises a casing 53 in which is provided a main passage 54 by which the air passes through the conduit 16 to the beer barrel 17 along the route of the arrows 54 (Fig. 5). Arranged in this passage is a centrally bored threaded mounting 55 which carries a rubber air check valve 56, which is similar in construction to the valve 24—25 of Figs. 6, 7, and 8. However, the valve 48 includes a by-pass in which is arranged a rotatable valve core 58 having a transverse port 59 which is normally disposed out of registration with the by-pass 57 so as to close the latter when air is passing from the storage tank 15 into the beer barrel 17.

It is desirable to drain the tap or dispensing line between the beer barrel 17 and the taps, and which line includes the cooling coils 19, at the end of each day, so as to prevent the beer from standing and souring in the dispensing line. To this end the intake line 13 is opened, causing water to flow through the ejector 20—21, a cover 64 over the valve 25 is closed, the beer taps are opened, the valve 50 is positioned to shut off air flow from the storage tank 15 to the beer barrel 17 and open the line 16—61, the valve 43 is positioned to prevent air flow into the storage tank 15 and open the line 14—63, and the valve core 58 is rotated by its handle 60 so as to register its port 59 with the by-pass 57 (Fig. 5), whereupon the water flowing out of the ejector 20—21 reduces the air pressure therein and causes the air under pressure in the air space or upper area 52 of the beer barrel 17 to flow out of the same through the sleeve 51 into the valve 48, and through the latter by way of the by-pass 57—59, into the conduit 16. During this operation the valve 50 (Fig. 1), is positioned to allow the air to flow from the conduit 16 into the branch line 61 (Fig. 1) through an air check valve 62 arranged in the conduit 61 and similar in construction and operation to the valve 24—25 of Figs. 6, 7, and 8; thence the air passes into the injector tube 21 with which the branch line 61 connects inside the air compression chamber 12. This relieves the air pressure in the area 52 above the beer level in the barrel 17 and allows the beer in the dispensing or tap line 18, including the cooling coils 19, to gravitate back into the beer barrel 17. This prevents souring of the beer, due to standing, in the dispensing or tap line 18.

During this draining operation the valve 43 is positioned to close the line 14 to the air storage tank 15 and to open a branch connecting line 63 which communicates with the drain outlet 42. This allows air from the upper area of the beer barrel 17 to be discharged by way of the line 51—16—50—61—21—23—12—14 and 63 into the drain outlet 42.

It is an important feature of the present invention that the hereinbefore described cycle of air-compressing operations, first filling the lower area of the compression chamber 12 with water and then emptying the same, is entirely automatic in operation, repeats itself as long as the water inlet line 13 is open, and continues until the air pressure in the air pressure storage tank 15 substantially equals the water pressure in the water intake or source 13. In the combination which constitutes the present invention, this feature as well as the feature of washing and cooling the air in the compression chamber 12, and filtering the air in its passage between the compression chamber 12 and the storage tank 15, together with the feature of manipulating the apparatus to drain the tap line 18, and other features, are considered new in the art.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In a beer apparatus, the combination of: an air-compression chamber provided with an air inlet and having a water inlet adapted for connection to a source of water under pressure; an air pressure storage tank having communication with the upper area of said compression chamber and adapted for communication with the upper area of a beer barrel or other like container; and means in said air compression chamber having an automatic cycle of operations during which cycle the lower area of said compression chamber is successively first filled with water from said water inlet so as to compress the air in the upper area thereof and deliver the same thus compressed to the said air pressure storage tank, and then emptied; said cycle of operations repeating itself as long as the said water inlet is open and continuing until the air pressure in the said air pressure storage tank substantially equals the water pressure in the said source of the latter; said apparatus comprising means including a device arranged in the upper area of said compression chamber for withdrawing air under pressure from the upper area of a beer barrel or like container into said compression chamber so as to drain the beer tap or dispensing line back into the beer barrel or like container when the said tap line is not in use.

2. In a beer apparatus, the combination of: an air-compression chamber provided with an inlet and a water outlet and having a water inlet adapted for connection to a source of water under pressure; an air pressure storage tank having communication with the upper area of said compression chamber and having a discharge conduit adapted for communication with the upper area of a beer barrel or like container; and means in said air-compression chamber having an automatic cycle of operations during which cycle the lower area of said compression chamber is first filled with water from said water inlet so as to compress the air in the upper area thereof and deliver the same thus compressed to the said air pressure storage tank, and then emptied; said means comprising a float in said compression chamber; a combination air and water valve in said compression chamber for discharging compressed air from the upper area of said compression chamber and water from the lower area thereof out of said water outlet; means coacting with said float first to momentarily open said air valve and then subsequently to open said water valve as the water level and float reach their upper heights in said compression chamber; means coacting with said last-named means for holding said water valve in open position so as to drain the water out of said compression chamber; and means coacting with the said float and holding means to close said water valve as the float reaches its lower position in said chamber.

3. In a beer apparatus, the combination of: an air-compression chamber having an air inlet and provided with a water inlet and a water outlet; an air pressure storage tank having communication with the upper area of said compression chamber; means associated with said water inlet and with said air inlet constantly injecting both air and water into said compression chamber as long as said water inlet is open; a float in said compression chamber; a combination air and water valve in said compression chamber for discharging both compressed air from the upper area of said compression chamber and water from the lower area thereof out of said water outlet; means coacting with said float first to momentarily open said air valve and then subsequently to open said water valve as the water level and float reach their upper heights in said compression chamber; means coacting with said last-named means for holding said water valve in open position as the float drops so as to drain the water out of said compression chamber; and means coacting with said float and holding means to close said water valve as the float reaches its lower position in said chamber.

4. In a draft beer apparatus, the combination of: an air compression and water chamber provided with an air inlet and having a water inlet adapted for connection to a source of water under pressure; an air pressure storage tank having communication with the upper area of said air compression chamber; a unit for dispensing beer from a barrel or like container having communication with said pressure tank; means in said air compression chamber cyclically and automatically filling the lower area of said compression chamber with water and emptying the same so as to compress the air in the upper area of said compression chamber so that the air thus compressed will be in this condition delivered to the said pressure tank and delivered from the latter to the upper area of the said beer barrel or like container so as to force the beer out of the said barrel or like container through said dispensing unit; said apparatus including a device for injecting water into said compression chamber; and means coacting with said device for withdrawing air under pressure from the upper area of the said beer barrel or like container into said compression chamber so as to drain the tap or dispensing unit including the cooling coils embodied therein back into the said beer barrel or like container when the dispensing unit it not in use.

JOHN VOSS.